United States Patent [19]

Nishijima et al.

[11] Patent Number: 5,431,288
[45] Date of Patent: Jul. 11, 1995

[54] MAIL SORTING APPARATUS

[75] Inventors: Yasuo Nishijima; Ichiro Kaneko; Tokurou Hamada, all of Tokyo, Japan

[73] Assignee: NEC Corporation, Tokyo, Japan

[21] Appl. No.: 932,197

[22] Filed: Aug. 19, 1992

[30] Foreign Application Priority Data

Aug. 28, 1991 [JP] Japan .................. 3-217262
Jan. 29, 1992 [JP] Japan .................. 4-38695

[51] Int. Cl.⁶ .................. B07C 5/00; G06F 3/12
[52] U.S. Cl. .................. 209/584; 209/900; 235/381; 235/432
[58] Field of Search .............. 209/375, 462, 546, 583, 209/584, 900; 235/381, 375, 432; 382/1, 8, 57

[56] References Cited

U.S. PATENT DOCUMENTS

| | | | |
|---|---|---|---|
| 4,034,341 | 7/1977 | Isono et al. | 209/584 X |
| 4,317,030 | 2/1982 | Berghell | 209/900 X |
| 4,606,660 | 8/1986 | Bradshaw et al. | 209/584 X |
| 4,632,252 | 12/1986 | Haruki et al. | 209/584 |
| 4,641,753 | 2/1987 | Tamada | 209/584 |
| 4,757,189 | 7/1988 | Daboub | 235/432 X |
| 4,796,196 | 1/1989 | Durst, Jr. et al. | 209/584 X |
| 4,871,903 | 10/1989 | Carrell | 235/432 |
| 4,970,655 | 11/1990 | Winn et al. | 235/381 X |
| 4,992,649 | 2/1991 | Mampe et al. | 235/375 |
| 5,034,985 | 7/1991 | Keough | 209/900 X |

FOREIGN PATENT DOCUMENTS

| | | |
|---|---|---|
| 0076332 | 9/1981 | European Pat. Off. |
| 0281007 | 9/1988 | European Pat. Off. |
| 48248 | 12/1986 | Germany |
| 53-62599 | 6/1978 | Japan |
| 3-91884 | 4/1991 | Japan |
| 4148965 | 5/1992 | Japan .................. 235/432 |

Primary Examiner—William E. Terrell
Assistant Examiner—Tuan N. Nguyen
Attorney, Agent, or Firm—Whitham, Curtis, Whitham & McGinn

[57] ABSTRACT

A mail sorting apparatus includes a video signal conversion section for photoelectrically converting and quantizing characters, codes, and the like on a mail item into a video signal, a blank area detection section for detecting a blank area where characters, codes, and the like are not described on the basis of the video signal output from the video signal conversion section, a printing area designation section for designating a bar code printing area in the blank area detected by the blank area detection section, and a bar code printing section for printing a bar code corresponding to an address of the mail item on the printing area designated by the printing area designation section. Further, the printing area designation section designates the bar code printing area from a blank area obtained by excluding a window area detected by a window position detection section from the blank area detected by the blank area detection section.

11 Claims, 8 Drawing Sheets

MAIL SORTING APPARATUS

BACKGROUND OF THE INVENTION

The present invention relates to a mail sorting apparatus and, more particularly, to an apparatus for reading an address on a mail item, converting the reading result into a bar code, printing the converted bar code on the mail item, and then sorting the mail item.

Figure 8:
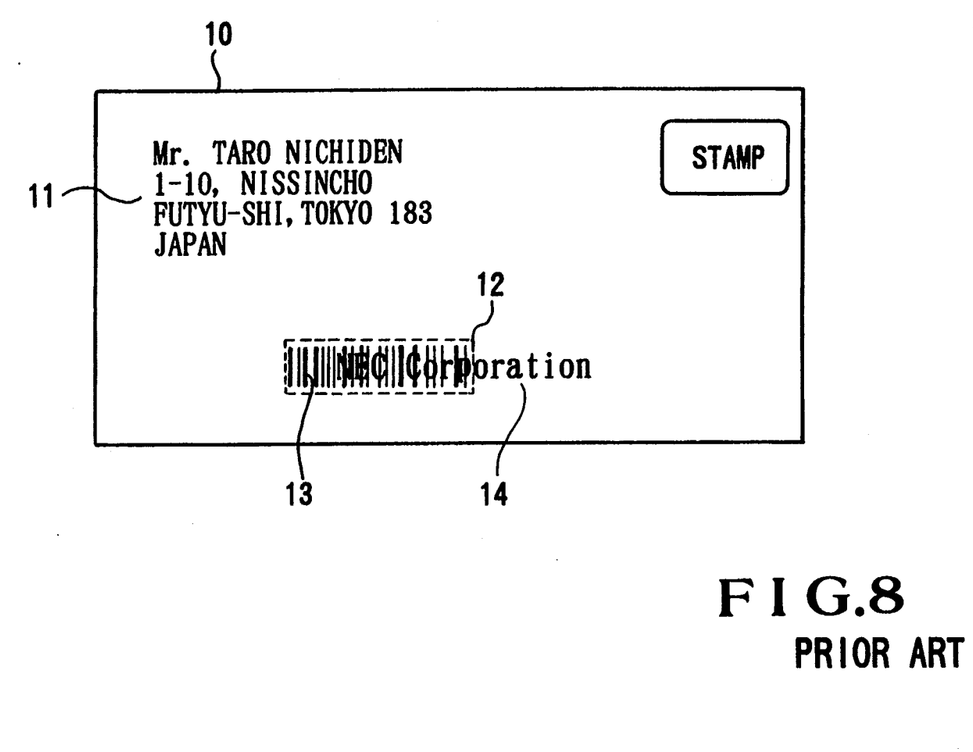
FIG. 8 is a plan view showing an example of a mail item on which a bar code is printed on a conventional bar code area.

In a conventional mail sorting apparatus, as shown in FIG. 8, an address 11 printed or handwritten on a mail item 10 is read by an optical character reader, and the reading result of the address is converted into a bar code 13. The converted bar code 13 is printed on a predetermined bar code printing area 12. Thereafter, the printed code is optically read to sort the mail item to a corresponding sorting box.

In the conventional sorting apparatus, since the bar code printing area 12 is predetermined, even when characters or codes such as an advertisement or a company's name, as indicated by reference numeral 14, are printed on this area, the bar code 13 is printed to overlap the company's name. As a result, the bar code cannot be optically read, and the mail item is undesirably rejected as a read error without being sorted.

Furthermore, in the conventional sorting apparatus, the bar code printing area is designated on the basis of a blank area where characters, codes, and the like are not printed, which area is determined according to a video signal obtained by photoelectric conversion and quantization of diffused light from the surface of a mail item. Therefore, when a blank area of a window portion of a mail item having a glossy surface and a window (e.g., a window envelope) of a transparent material, e.g., cellophane paper, or a blank area of a portion other than an address label of a vinyl envelope is designated as the bar code printing area, a bar code is printed on this area independently of the material.

However, the bar code ink is not immediately dried on, e.g., the cellophane paper, and is blurred due to contact with a transport system of the mail item 10. As a result, the bar code cannot be optically read, and the mail item is undesirably rejected as a read error without being sorted.

SUMMARY OF THE INVENTION

It is, therefore, an object of the present invention to provide a mail sorting apparatus, which inhibits printing of a bar code on an area, which may cause a read error.

It is another object of the present invention to provide a mail sorting apparatus, which can eliminate a sorting error by improving reading precision of a bar code.

It is still another object of the present invention to provide a mail sorting apparatus, which can reliably sort even a window envelope and a transparent envelope.

In order to achieve the above objects, according to the present invention, there is provided a mail sorting apparatus comprising video signal conversion means for photoelectrically converting characters, codes, and the like on a mail item into a quantized video signal, blank area detection means for detecting a blank area where characters, codes, and the like are not described on the basis of the video signal output from the video signal conversion means, printing area designation means for designating a bar code printing area in the blank area detected by the blank area detection means, and bar code printing means for printing a bar code corresponding to an address of the mail item on the printing area designated by the printing area designation means.

DESCRIPTION OF THE PREFERRED EMBODIMENTS

The preferred embodiments of the present invention will now be described with reference to the accompanying drawings.

Figure 1:
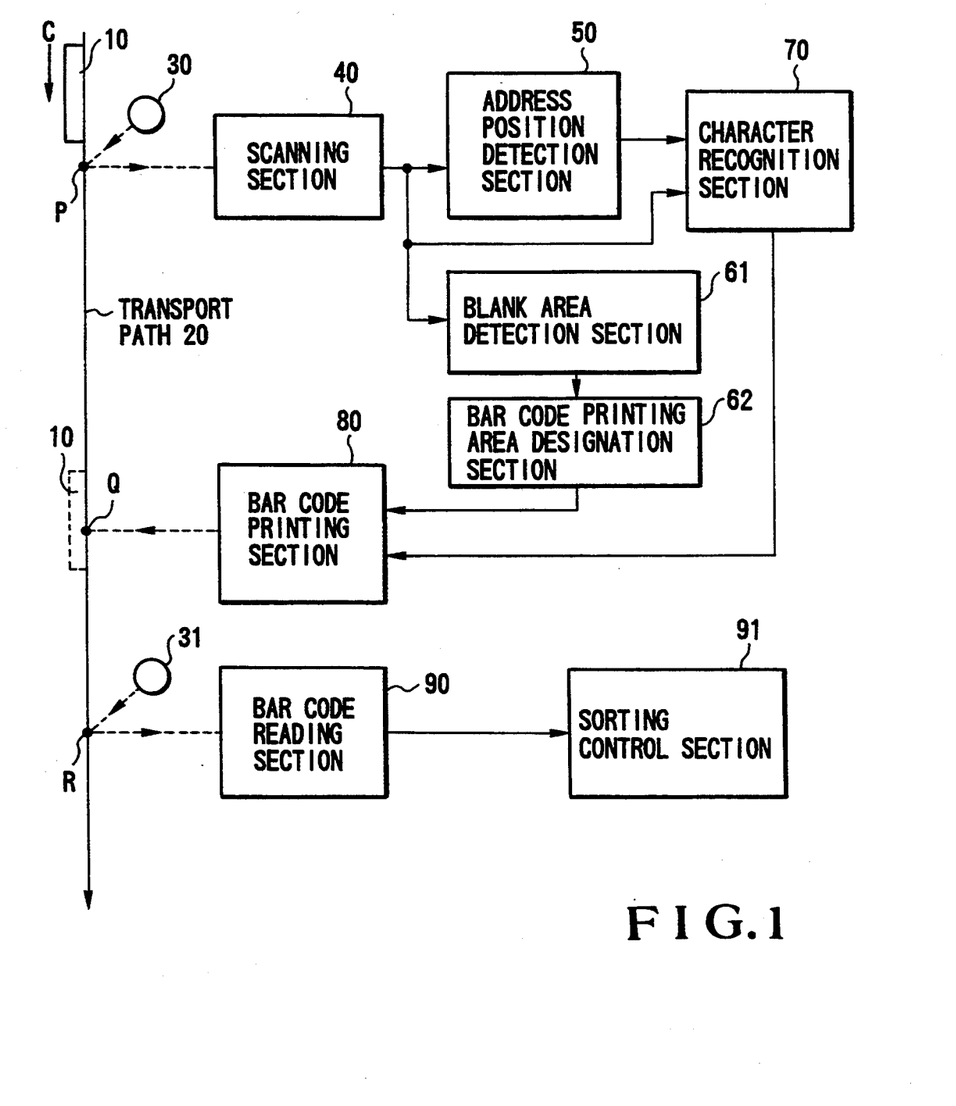
FIG. 1 is a block diagram showing an embodiment of a mail sorting apparatus according to the present invention.

FIG. 1 shows the arrangement of a mail sorting apparatus according to an embodiment of the present invention. In FIG. 1, reference numeral 10 denotes a mail item such as an envelope; 20, a transport path for transporting the mail item 10 in the longitudinal direction thereof; 30 and 31, light sources, arranged along the transport path to be separated at a predetermined interval, for respectively illuminating the transported mail item 10 at detection points P and R; 40, a scanning section such as a CCD sensor for receiving light emitted from the light source 30 and reflected by the mail item at the detection point P so as to read the mail item 10, which is fed in the subscanning direction, in the main scanning direction, and converting the received light into an electrical signal; 50, an address position detection section for receiving the signal output from the scanning section 40, and detecting an address position; 61, a blank area detection section for detecting a blank area on the basis of a video signal from the scanning section 40; 62, a bar code printing area designation section for designating a bar code printing area from the blank area detected by the blank area detection section 61; 70, a character recognition section for recognizing written characters on the basis of the signals from the scanning section 40 and the address position detection section 50; 80, a bar code printing section for printing, at a printing point Q, a bar code on the designated area of the address-detected mail item 10 on the basis of the signals from the bar code printing area designation section 62 and the character recognition section 70; 90, a bar code reading section for reading the bar code printed by the bar code printing section 80 at the detection point R; and 91, a sorting control section for sorting the mail item 10 on the basis of the reading result of the bar code reading section 90.

The operation of this apparatus will be described below.

The mail item 10 is transported along the transport path 20 in its longitudinal direction (a direction of an arrow C). When the mail item 10 passes by the detection point P, the entire mail item is irradiated with light emitted from the light source 30, and light reflected by the mail item is projected onto the scanning section 40. The scanning section 40 periodically scans the mail item 10, which is fed in the subscanning direction (the direction of the arrow C), in the main scanning direction, and outputs a video signal, which is obtained by photoelectric conversion and quantization of characters, codes, and the like on the mail item 10, to the address position detection section 50, the blank area detection section 61, and the character recognition section 70. The address position detection section 50 detects the position of an address printed or handwritten on the mail item 10, and supplies a signal indicating the address position to the character recognition section 70.

Figure 2:
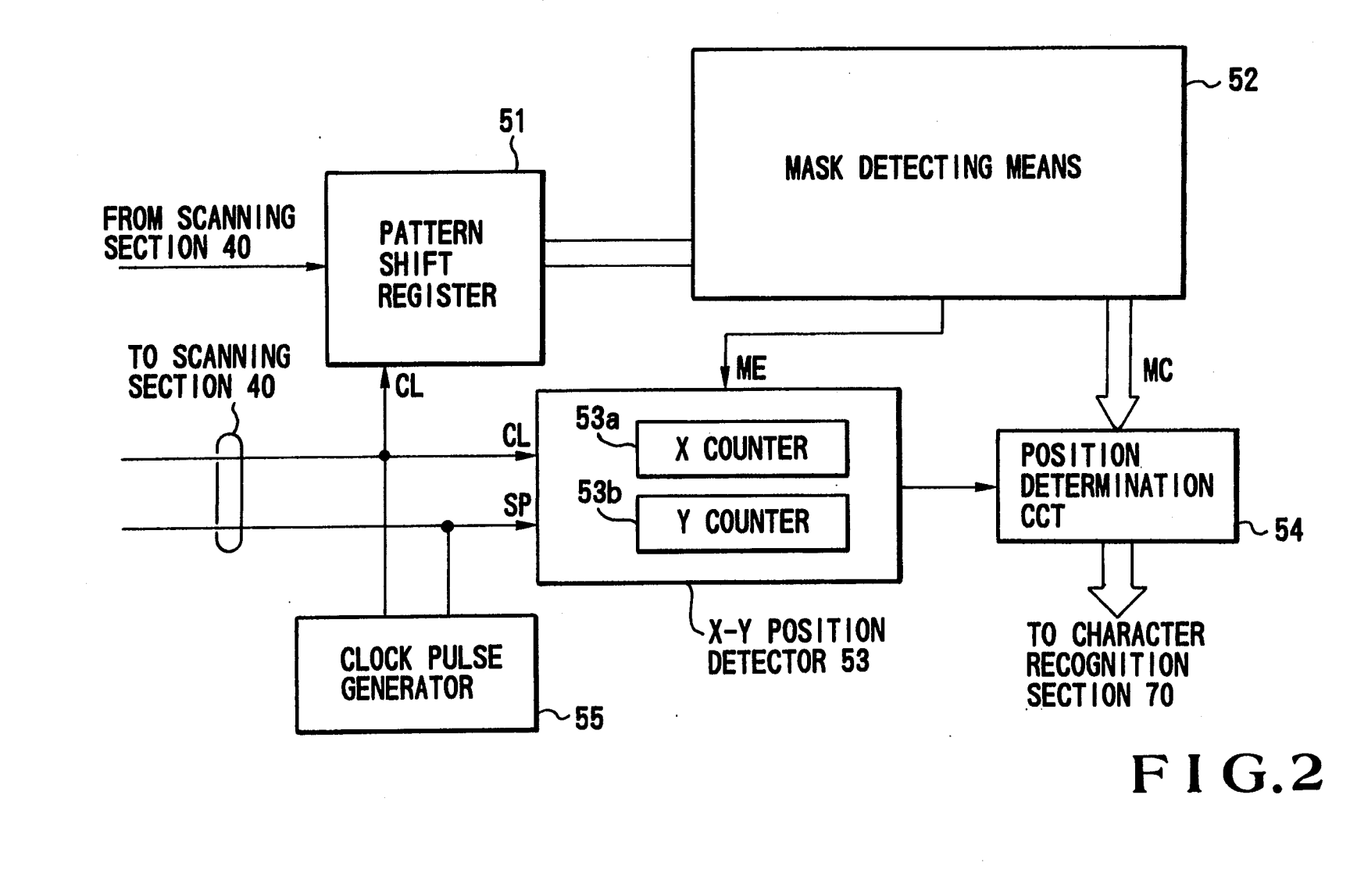
FIG. 2 is a block diagram showing an arrangement of an address position detection section shown in FIG. 1.

FIG. 2 shows the details of the address position detection section 50 shown in FIG. 1. The address position detection section 50 comprises a pattern shift register 51, a mask detecting means 52, an X-Y position detector 53, a position determination circuit 54, and a clock pulse generator 55. The pattern shift register 51 receives a video signal from the scanning section 40, which signal is obtained by scanning a designated address entry area 15 (FIG. 3) having a predetermined width on the mail item 10, and temporarily stores the video signal for one block obtained by feeding the mail item in the subscanning direction by a predetermined pitch, i.e., by a predetermined number of times of subscanning feed operations. The mask detecting means 52 further divides the video signal for one block output from the pattern shift register 51, and detects a predetermined pattern constituted by "black" and "white" pixels from each divided block, thereby generating a mask signal MC indicating the leading edge, trailing edge, and height of, e.g., a character. The X-Y position detector 53 has X- and Y-counters 53a and 53b for measuring X- and Y-coordinate positions as character entry position information. The X-counter 53a counts the number of times of main scanning operations in the longitudinal direction of the mail item 10, and the Y-counter 53b counts clock signals CL generated from the clock pulse generator 55, which signals are used for quantizing a photoelectrically converted video signal in each main scanning operation. The position information from the X- and Y-counters 53a and 53b is output to the position determination circuit 54 in response to a mask existing signal ME from the mask detecting means 52. The position determination circuit 54 determines a character entry range (coordinate information of two points) and a character size on the basis of the mask signal MC from the mask detecting means 52 and the X-Y position signal from the X-Y position detector 53, and outputs them to the character recognition section 70. The clock pulse generator 55 supplies the clock signals CL and start pulses SP to the scanning section 40 and the X-Y position detector 53. Note that further details of the address position detection section 50 are described in U.S. Pat. No. 4,034,341.

Figure 3:
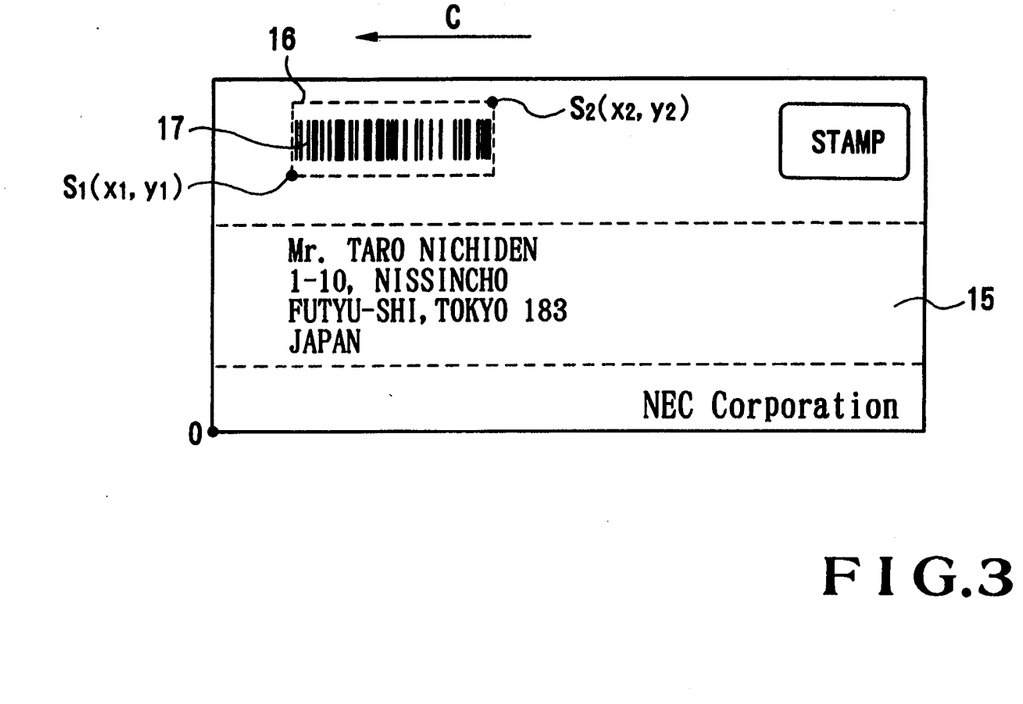
FIG. 3 is a plan view showing an example of a mail item on which a bar code is printed.

The blank area detection section 61 detects an area where characters, codes, and the like are not printed, i.e., a blank area, from the video signal on the mail item 10. The bar code printing area designation section 62 designates a bar code printing area 16 from the blank area detected by the blank area detection section 61, as shown in FIG. 3. Like in the output from the address position detection section 50, the printing area 16 is defined by the coordinates of two points $S_1(x_1, Y_1)$ and $S_2(x_2, y_2)$ when the lower left end of the mail item 10 is assumed as an origin 0. These coordinates are output to the bar code printing section 80 as position information. The bar code printing section 80 prints a bar code 17 corresponding to the address read by the character recognition section 70 on the printing area 16. Note that a technique for detecting a blank area and representing the detected blank area as coordinate information can be easily realized by adopting the technique described in the above-mentioned U.S. Pat. No. 4,034,341, i.e., by detecting an area other than a character/code string. In this case, a blank area may be directly detected, or an area of a character/code string may be detected first, and then, an area excluding the detected area may be determined as a blank area.

The character recognition section 70 performs character recognition of an address 11 on the basis of the video signal output from the scanning section 40, and the address position information and character height information output from the address position detection section 50, and converts the recognition result into bar code information. The bar code information is output to the bar code printing section 80.

Note that the character recognition technique is known to those who are skilled in the art, and a detailed description thereof will be omitted here.

The bar code printing section 80 measures a timing from when the mail item 10 reaches the printing point Q on the basis of printing position designation information output from the bar code printing area designation section 62, thereby printing the bar code 17 corresponding to the bar code information output from the character recognition section 70 on the bar code printing area 16.

When an ink-jet printer, for example, is utilized as a means for printing a bar code, a fine bar code can be printed.

The mail item 10 printed with the bar code is further transported. When the mail item 10 passes by the detection point R, it is irradiated with light emitted from the light source 31, and light reflected by the mail item is projected onto the bar code reading section 90. The bar code reading section 90 photoelectrically converts reflected light, and quantizes the converted signal to obtain a video signal, thereby detecting the bar code printing position, and reading the bar code.

The reading result of the bar code is output to the sorting control section 91, and the mail item 10 is sorted into a corresponding sorting box.

In this embodiment, the detection of the address entry position and the character recognition are performed using the output from the common scanning section 40. Alternatively, two scanning sections, i.e., a pre-scanning section and a main scanning section may be arranged. In this case, the pre-scanning section detects an address entry area, and then, character recognition is performed based on the address entry area determined based on coordinate information. Thus, high-precision character recognition processing can be performed, and a character recognition error caused by noise can be prevented.

Figure 4:
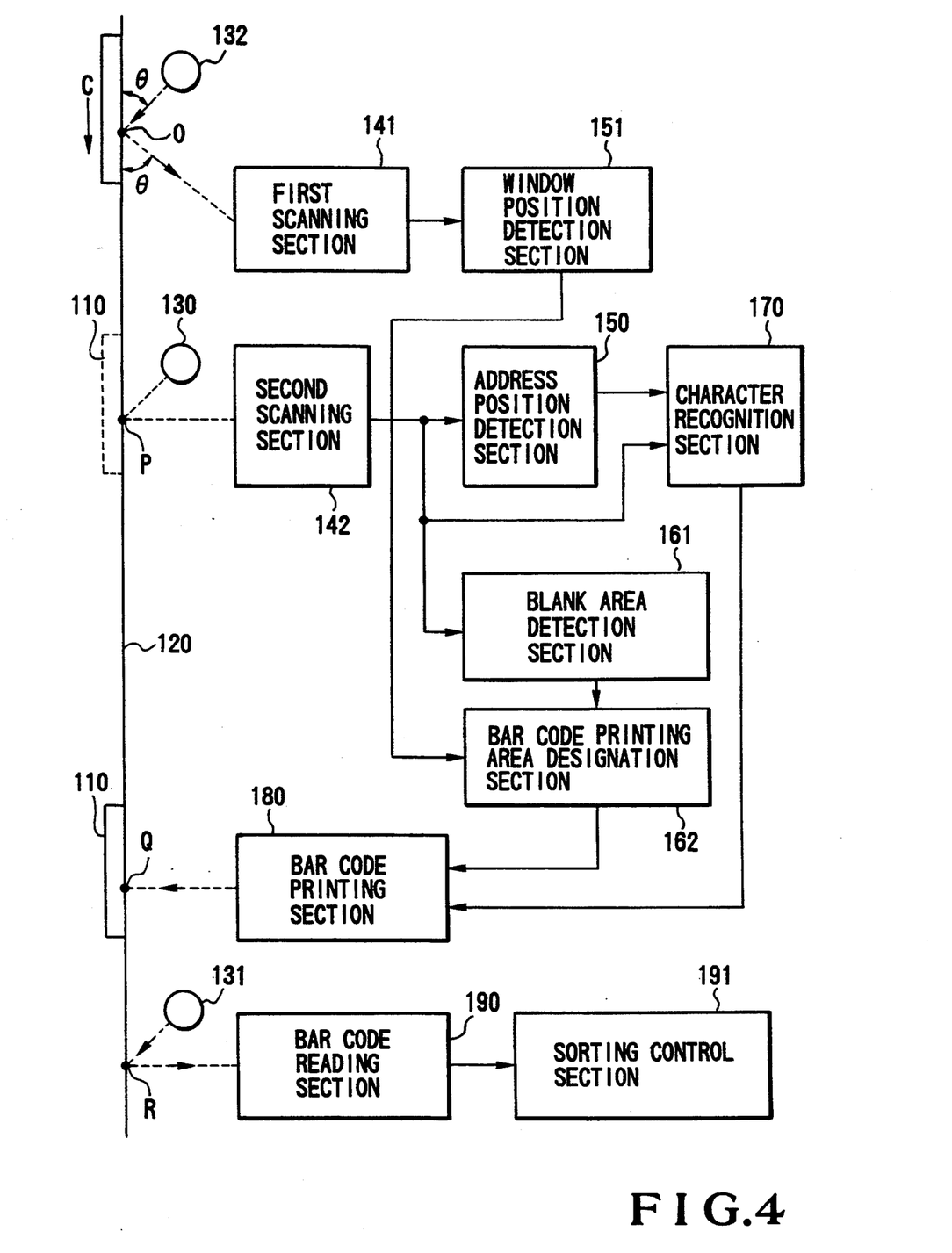
FIG. 4 is a block diagram showing another embodiment of a mail sorting apparatus according to the present invention.

FIG. 4 shows another embodiment of a mail sorting apparatus according to the present invention. In this embodiment, window envelopes are sorted. In FIG. 4, a difference from the mail sorting apparatus shown in FIG. 1 is as follows. That is, a light source 132 for illuminating a point O before a point P on a transport path 120, a first scanning section 141 for photoelectrically converting light emitted from the light source 132 and reflected by a mail item 110 by scanning, and a window position detection section 151 for receiving the output from the first scanning section 141 are added. In addition, a bar code printing area designation section 162 determines a printing area on the basis of a position signal from the window position detection section 151 and information from a blank area detection section 161. Note that a second scanning section 142 corresponds to the scanning section 40 shown in FIG. 1.

The operation of this embodiment will be described below.

The mail item 110 is transported along the transport path 120 in a direction of an arrow C. When the mail item 110 passes by the detection point O, the entire mail item 110 is irradiated with light emitted from the light source 132, and light regularly reflected by the mail item is projected onto the first scanning section 141. Note that the first scanning section 141 is located at a position along the extended line of a reflection angle $\theta$ with respect to an incident angle $\theta$ of light emitted from the light source 132, so that regularly reflected light from the light source 132 can be projected onto the first scanning section 141.

The first scanning section 141 outputs a video signal obtained by photoelectric conversion and quantization of light regularly reflected by the surface and a glossy window portion having a high regular reflectance of the mail item 110 to the window position detection section 151. The window position detection section 151 detects the position of a window 118 on the mail item 110 on the basis of reflected light obtained from the window portion; and supplies a signal indicating the window position to the bar code printing area designation section 162. An area indicating the position of the window 118 is defined by the coordinates of two points $W_1 (x_1, y_1)$ and $W_2 (x_2, y_2)$ to have the lower left end of the mail item 110 as an origin 0.

As a window position detection technique, for example, a technique described in Japanese Patent Laid-Open No. 53-62599 is used. In this technique, information of a window portion is obtained by utilizing the difference between the reflectances of light on a window and an envelope surface.

Then, the mail item 110 passing by the detection point O in FIG. 4 is transported further. When the mail item 110 passes by the detection point P, the entire mail item 110 is irradiated with light emitted from a light source 130, and light reflected by the mail item 110 (diffused light) is projected onto the second scanning section 142.

The second scanning section 142 outputs a video signal, which is obtained by photoelectric conversion and quantization of characters, codes, and the like on the mail item 110, to an address position detection section 150, the blank area detection section 161, and a character recognition section 170.

Figure 5:
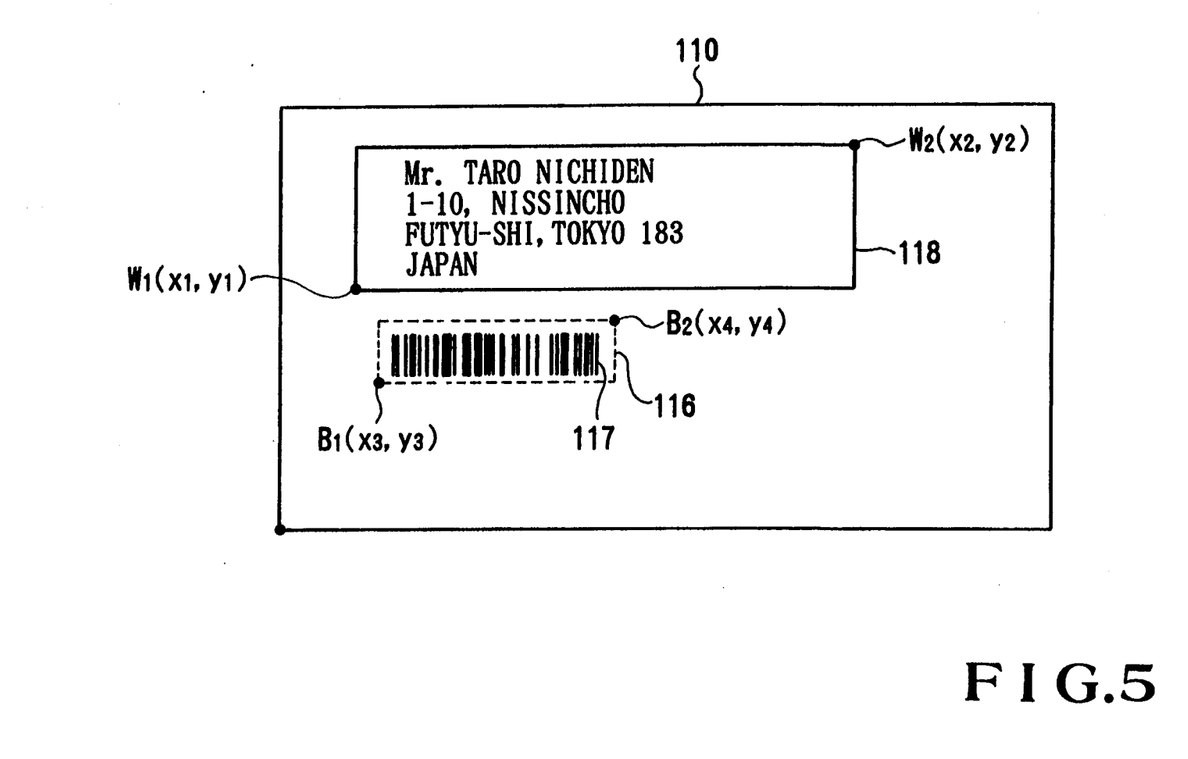
FIG. 5 is a plan view of a mail item for explaining the operation of FIG. 4.

The bar code printing area designation section 162 detects an area other than the window 118 on the mail item 110 and where characters, codes, and the like are not printed, i.e., a blank area on the basis of position information from the window position detection section 151 and position information from the blank area detection section 161, thereby designating a bar code printing area 116 at a proper position. The area 116 is defined by, e.g., the coordinates of two points $B_1 (x_3, y_3)$ and $B_2 (x_4, y_4)$ in FIG. 5, and is output as position information to a bar code printing section 180. More specifically, the bar code printing area 116 is designated at an arbitrary position in a blank area excluding the window 118 on the mail item 110, and a bar code 117 corresponding to an address is printed on this area.

Figure 6:
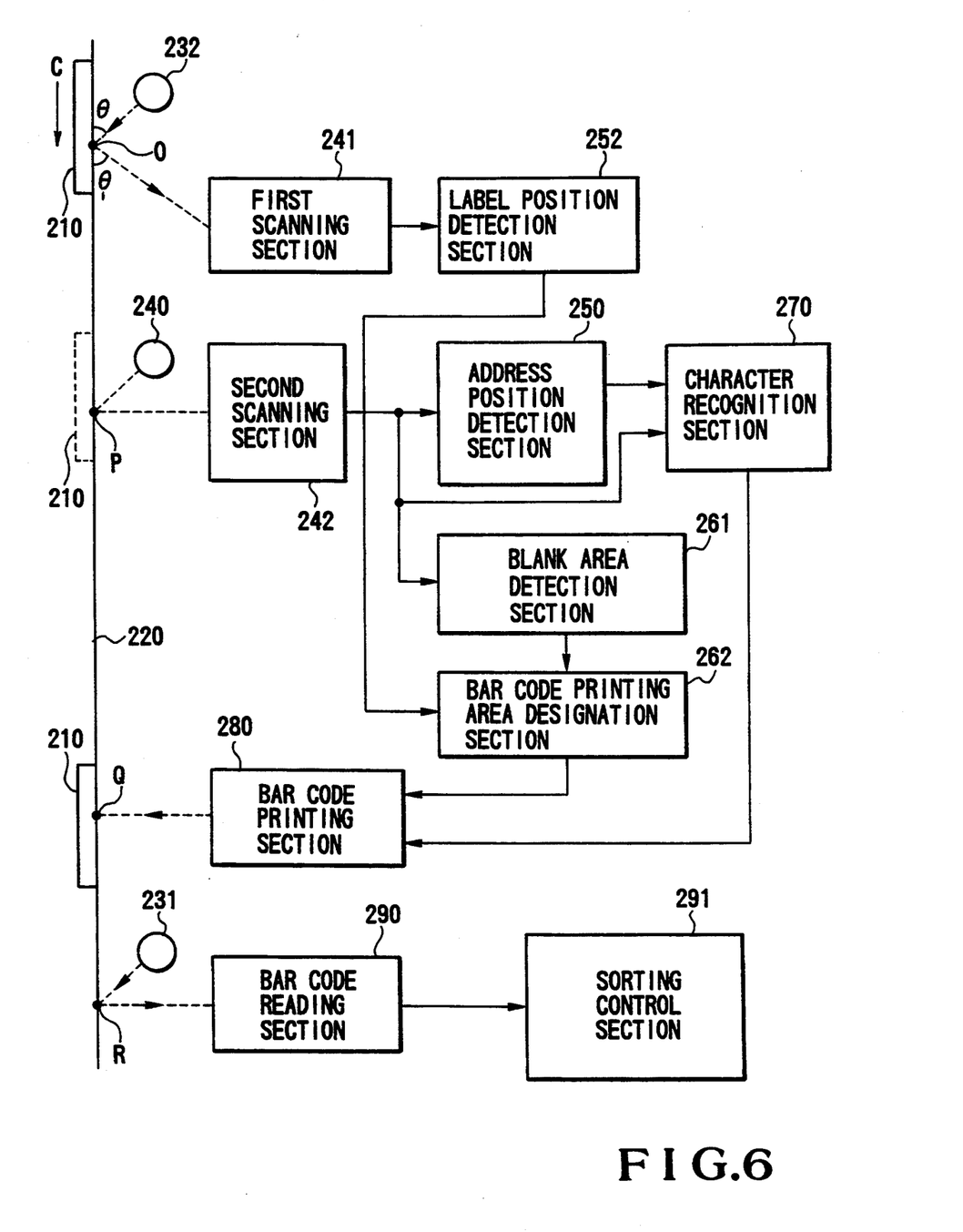
FIG. 6 is a block diagram showing still another embodiment of a mail sorting apparatus according to the present invention.

On the other hand, the arrangement for a vinyl envelope can be realized by replacing the window position detection section 151 shown in FIG. 4 with a label position detection section 252, as shown in FIG. 6.

Figure 7:
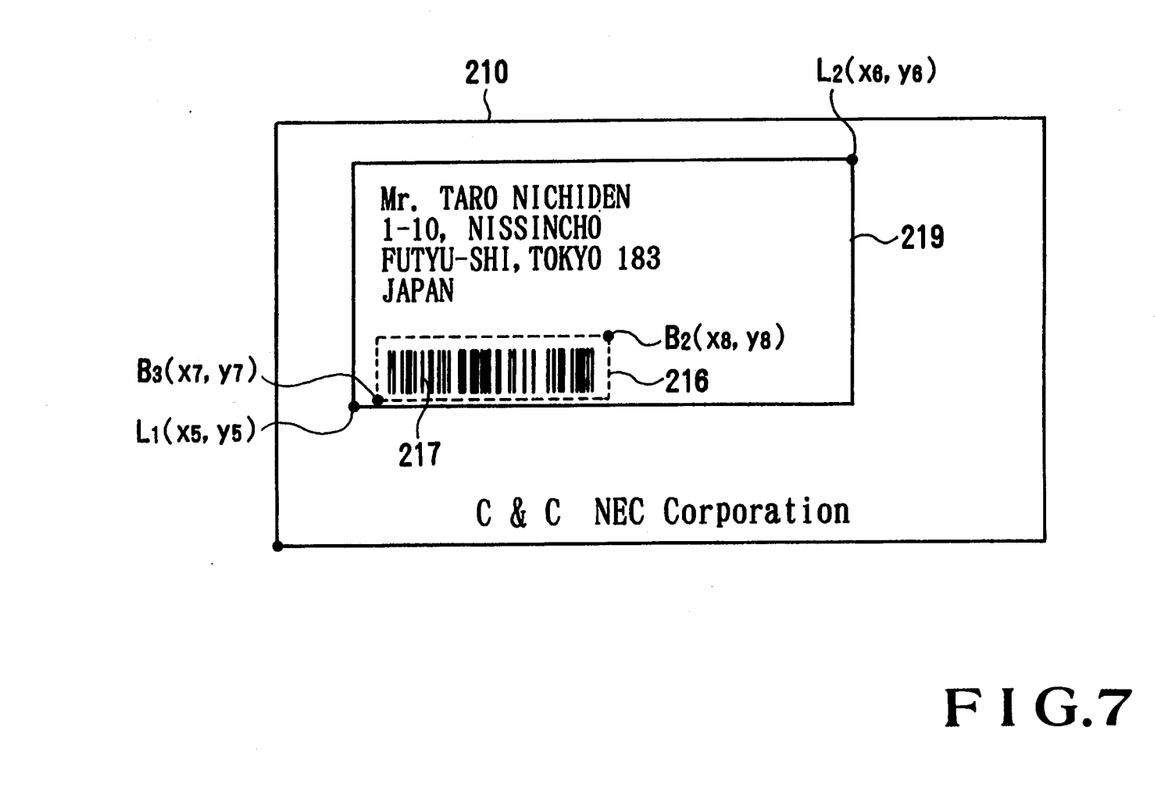
FIG. 7 is a plan view of a mail item for explaining the operation of FIG. 6.

In FIG. 6, the label position detection section 252 defines the position of a label 219 by the two coordinate positions $L_1 (x_5, y_5)$ and $L_2 (x_6, y_6)$, as shown in FIG. 7. A bar code printing area designation section 262 detects a blank area within the label area 219 and where characters, codes, and the like are not printed or handwritten on the basis of the above-mentioned position information, and information supplied from a blank area detection section 261, thereby designating a bar code printing area 216. The area 216 is defined by, e.g., the coordinates of two points $B_3 (x_7, y_7)$ and $B_4 (x_8, y_8)$ in FIG. 7, and a bar code 217 is printed in this area.

As a technique for detecting the label position on a vinyl envelope, a technique described in Japanese Patent Laid-Open No. 3-91884 is used. In this technique, the difference between a high reflectance of an envelope portion and a low reflectance of a label portion is detected.

As described above, according to the present invention, a blank area on a mail item is detected, and a bar code is printed on the detected area, thereby improving reading precision of a bar code.

Furthermore, the position of a window or a label on a mail item is detected, and a blank area is detected outside the window or inside the label, so that a bar code can be printed on the detected blank area. Therefore, since a bar code printed using this technique can be clearly read, a sorting apparatus can further improve reading precision of a bar code.

What is claimed is:

1. A mail sorting apparatus comprising:
video signal conversion means for photoelectrically converting and quantizing characters, codes, and visual obstructions on a mail item into a video signal;
blank area detection means for detecting a blank area on the mail item, where the characters, codes, and visual obstructions are not described, on the basis of the video signal output from the video signal conversion means;
printing area designation means for designating a bar code printing area having a predetermined form in the blank area detected by said blank area detection means;
bar code printing means for printing a bar code corresponding to an address of the mail item on the bar code printing area designated by said printing area designation means;
bar code reading means for reading a bar code from the mail item printed with the bar code; and
a sorting control section for sorting the mail item on the basis of the bar code read by said bar code reading means,
wherein said video signal conversion means includes means for scanning a surface of said mail item in its substantial entirety, said surface of said mail item being scanned in its substantial entirety prior to said printing area designation means designating said bar code printing area and prior to said bar code printing means printing said bar code on said bar code printing area.

2. A mail sorting apparatus according to claim 1, further comprising character recognition means for recognizing the address described on the mail item on the basis of the video signal output from said video signal conversion means, and wherein said bar code printing means prints the bar code corresponding to the address recognized by said character recognition means.

3. A mail sorting apparatus according to claim 2, further comprising address position detection means for detecting an address entry position on the basis of the video signal output from said video signal conversion means, and wherein said character recognition means performs a recognition operation within an address entry area specified by said address position detection means.

4. A mail sorting apparatus according to claim 1, wherein said priming area designation means outputs the designated printing area on the mail item as X-Y coordinate information to said bar code printing means.

5. A mail sorting apparatus according to claim 1, further comprising window detection video signal output means for outputting a video signal obtained by photoelectrically converting and quantizing light incident at a predetermined angle on an entire surface of the mail item and reflected by the entire surface of the mail item, and window position detection means for detecting a position of a window, which is formed of a glossy material having a high regular reflectance, and is formed on the mail item, on the basis of the video signal output from said window detection video signal output means, and wherein said printing area designation means designates the bar code printing area from a blank area obtained by excluding a window area detected by said window position detection means from the blank area detected by said blank area detection means.

6. A mail sorting apparatus according to claim 5, wherein the mail item is a transparent envelope on which an address is described within the window.

7. A mail sorting apparatus according to claim 1, further comprising label detection video signal output means for outputting a video signal obtained by photoelectrically converting and quantizing light incident at a predetermined angle on an entire surface of the mail item and reflected by the entire surface of the mail item, and label position detection means for detecting a label on the mail item, which has a high regular reflectance and is formed of a glossy material, on the basis of the video signal output from said label detection video signal output means, and wherein said printing area designation means designates the bar code printing area in the blank area detected by said blank area detection means within a label area detected by said label position detection means.

8. A mail sorting apparatus according to claim 7, wherein the mail item is a transparent envelope on which an address is described on an adhered label.

9. A mail sorting apparatus comprising:
video signal conversion means for photoelectrically converting and quantizing characters, codes, and visual obstructions on a mail item into a video signal;
address position detection means for detecting an address entry position on the mail item on the basis of the video signal output from said video signal conversion means;
character recognition means for recognizing the address described on the mail item on the basis of the video signal in an area specified by said address position detection means;
blank area detection means for detecting a blank area on the mail item where characters, codes, and visual obstructions are not described, on the basis of the video signal output from said video signal conversion means;
printing area designation means for designating a bar code printing area having a predetermined form in the blank area detected by said blank area detection means;
bar code printing means for printing a bar code corresponding to the address recognized by said character recognition means on the bar code printing area designated by said printing area designation means;
bar code reading means for reading a bar code from the mail item primed with the bar code; and
a sorting control section for sorting the mail item on the basis of the bar code read by said bar code reading means,
wherein said video signal conversion means includes means for scanning a surface of said mail item in its substantial entirety, said surface of said mail item being scanned in its substantial entirety prior to said printing area designation means designating said bar code printing area and prior to said bar code printing means printing said bar code on said bar code printing area.

10. A mail sorting apparatus according to claim 9, further comprising window detection video signal output means for outputting a video signal obtained by photoelectrically converting and quantizing light incident at a predetermined angle on an entire surface of the mail item and reflected by the entire surface of the mail item, and window position detection means for detecting a position of a window, which is formed of a glossy material having a high regular reflectance, and is formed on the mail item, on the basis of the video signal output from said window detection video signal output means, and wherein said printing area designation means designates the bar code printing area from a blank area obtained by excluding a window area detected by said window position detection means from the blank area detected by said blank area detection means.

11. A mail sorting apparatus according to claim 9, further comprising label detection video signal output means for outputting a video signal obtained by photoelectrically converting and quantizing light incident at a predetermined angle on an entire surface of the mail item and reflected by the entire surface of the mail item, and label position detection means for detecting a label on the mail item, which has a high regular reflectance and is formed of a glossy material, on the basis of the video signal output from said label detection video signal output means, and wherein said printing area designation means designates the bar code printing area in the blank area detected by said blank area detection means within a label area detected by said label position detection means.

* * * * *